(12) United States Patent
Shum

(10) Patent No.: US 8,929,033 B2
(45) Date of Patent: Jan. 6, 2015

(54) FLEXURE FOR IMPLEMENTATION ON A SUSPENSION IN A HARD DISK DRIVE FOR RESISTING WINDAGE EFFECTS

(75) Inventor: Wing Chun Shum, San Jose, CA (US)

(73) Assignee: HGST Netherlands B.V., Amsterdam (NL)

(*) Notice: Subject to any disclaimer, the term of this patent is extended or adjusted under 35 U.S.C. 154(b) by 1928 days.

(21) Appl. No.: 11/120,218

(22) Filed: May 2, 2005

(65) Prior Publication Data
US 2006/0245112 A1 Nov. 2, 2006

(51) Int. Cl.
*G11B 5/48* (2006.01)

(52) U.S. Cl.
CPC .................................. *G11B 5/4833* (2013.01)
USPC ...................................................... 360/245.9

(58) Field of Classification Search
USPC ........... 360/245.8, 245.9, 244.8, 245.3, 245.4
See application file for complete search history.

(56) References Cited

U.S. PATENT DOCUMENTS

| | | | | |
|---|---|---|---|---|
| 5,737,152 A * | 4/1998 | Balakrishnan | ............. | 360/245.9 |
| 5,812,344 A * | 9/1998 | Balakrishnan | ............. | 360/245.9 |
| 5,969,906 A | 10/1999 | Arya et al. | | |
| 5,978,177 A | 11/1999 | Takasugi | | |
| 6,243,235 B1 | 6/2001 | Fu et al. | | |
| 6,249,404 B1 | 6/2001 | Doundakov et al. | | |
| 6,351,348 B1 | 2/2002 | Erpelding et al. | | |
| 6,353,515 B1 * | 3/2002 | Heim | .................. | 360/245.9 |
| 6,442,828 B1 | 9/2002 | Albrecht et al. | | |
| 6,477,016 B1 * | 11/2002 | Yamaguchi et al. | ........ | 360/264.2 |
| 6,574,075 B2 | 6/2003 | Traskos et al. | | |
| 6,621,662 B1 * | 9/2003 | Khan et al. | .................. | 360/244.1 |
| 6,700,745 B2 | 3/2004 | Shiraishi | | |
| 6,708,389 B1 | 3/2004 | Carlson et al. | | |
| 6,741,426 B2 | 5/2004 | Girard | | |
| 6,760,196 B1 | 7/2004 | Niu et al. | | |
| 6,768,613 B1 * | 7/2004 | Coon | ......................... | 360/245.9 |
| 7,035,051 B1 * | 4/2006 | Coon | ......................... | 360/245.9 |
| 7,433,157 B2 * | 10/2008 | Arya et al. | ..................... | 360/246 |
| 7,489,479 B2 * | 2/2009 | Arya et al. | .................. | 360/245.9 |
| 2003/0011935 A1 * | 1/2003 | Saito et al. | .................. | 360/244.5 |
| 2003/0107843 A1 * | 6/2003 | Hanya et al. | ............... | 360/244.8 |
| 2003/0107844 A1 * | 6/2003 | Okamoto et al. | .......... | 360/245.2 |
| 2003/0193753 A1 * | 10/2003 | Arai et al. | .................. | 360/245.8 |
| 2004/0037011 A1 * | 2/2004 | Inoue et al. | .................. | 360/313 |
| 2004/0179303 A1 * | 9/2004 | Takikawa et al. | .......... | 360/245.9 |
| 2004/0240114 A1 * | 12/2004 | Takikawa et al. | .......... | 360/244.8 |
| 2005/0030670 A1 * | 2/2005 | Ando et al. | ................. | 360/244.8 |
| 2006/0007599 A1 * | 1/2006 | Shum | ......................... | 360/244.8 |
| 2006/0152854 A1 * | 7/2006 | Arya et al. | .................. | 360/245.9 |
| 2006/0158783 A1 * | 7/2006 | Arya et al. | .................. | 360/245.9 |
| 2006/0158784 A1 * | 7/2006 | Arya et al. | .................. | 360/245.9 |

* cited by examiner

*Primary Examiner* — Craig A. Renner

(57) ABSTRACT

A flexure resistant to windage effects present during operation of a hard disk drive is described. The flexure includes an end portion proximal to a slider. The flexure further includes an opposite end portion proximal to a tail of an actuator arm having swaged therewith a suspension. The flexure is interposed between the slider and the tail. The flexure also includes a flexure direction re-router. The flexure direction re-router has an inner radius and an outer radius. The outer radius of the flexure has greater rigidity than the inner radius. This greater rigidity provides resistance against the windage effects.

3 Claims, 9 Drawing Sheets

FLEXURE FOR IMPLEMENTATION ON A SUSPENSION IN A HARD DISK DRIVE FOR RESISTING WINDAGE EFFECTS

FIELD OF THE INVENTION

The present invention relates to an actuator assembly in a hard disk drive. More precisely, the present invention provides for reducing the effects of windage upon a flexure of an integrated lead suspension of a hard disk drive.

BACKGROUND OF THE INVENTION

Hard disk drives are used in almost all computer system operations, and recently even in consumer electronic devices such as digital cameras, video recorders, and audio (MP3) players. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago. The hard drive model includes a plurality of storage disks or hard disks vertically aligned about a central core that can spin at a wide range of standard rotational speeds depending on the computing application in which the hard disk drive is being used. Commonly, the central core is comprised, in part, of a spindle motor for providing rotation of the hard disks at a defined rotational speed. A plurality of magnetic read/write transducer heads, commonly one read/write transducer head per surface of a disk, where a head reads data from and writes data to a surface of a disk, are mounted on actuator arms.

Data is formatted as written magnetic transitions (information bits) on data tracks evenly spaced at known intervals across the disk. An actuator arm is utilized to reach out over the disk to or from a location on the disk where information is stored. The complete assembly at the extreme of the actuator arm, e.g., the suspension and magnetic read/write transducer head, is known as a head gimbal assembly (HGA).

In operation, pluralities of hard disks are rotated at a set speed via a spindle motor assembly having a central drive hub. Additionally, there are channels or tracks evenly spaced at known intervals across the disks. When a request for a read of a specific portion or track is received, the hard disk drive aligns a head, via the actuator arm, over the specific track location and the head reads the information from the disk. In the same manner, when a request for a write of a specific portion or track is received, the hard disk drive aligns a head, via the actuator arm, over the specific track location and the head writes the information to the disk.

Particularly, there is a tracing, also commonly referred to as a flexure, which is part of a suspension, that communicatively couples the read/write head or slider assembly with the tail portion of the actuator arm upon which a HGA is mounted. The tracing is commonly routed along the midline of the suspension, altered so that the tracing is routed in a direction perpendicular to the midline, and then altered again to parallel the midline but having a location toward an outer edge of the suspension. This type of traces routing is asymmetric. The asymmetry can create a twisting force on the hinges when the suspension is under dynamic loading such as shock and windage. This can also cause a mass imbalance by virtue of the traces and the flexure stainless steel disposed outside of the hinges, e.g., away from the centerline of the suspension. For example, during operation of the hard disk drive, the flexure is subject to windage, e.g., generated airflow within a hard disk drive, generated by the operation of the hard disk drive. When windage affects the flexure, the flexure can cause improper functioning of the suspension of which it is a part as well as the read/write head mounted on the suspension.

Prior art FIG. 7 is an illustrated image of a suspension and a tracing that depicts an effect of windage during operation of a hard disk drive. FIG. 7 shows a suspension having a transducer (read/write head) 8 mounted to a load beam 26. The suspension further includes a mount plate 23, a hinge plate 25 and a flexure 77. In the image shown in FIG. 7, flexure 77 is shown to have a bending and twisting motion in one of its natural frequency mode shapes. Laser welding is commonly, but not always, utilized for affixing a flexure 77 to a load beam 26. Conventionally, laser welding of a tracing is commonly, but not always, accomplished generally at weld points 41 and 42. As shown in FIG. 7, a portion of flexure 77 has lifted or separated from the load beam 26 during operation of the hard disk drive and as a result of windage. This separation or lifting can cause a rotational force to be applied to the suspension, thus causing a twisting of the hinge or the load beam or a combination thereof. This twisting motion can cause an increase in off-track motion of the slider of the suspension under windage. Off-track motion can increase instances of NRRO (non-repeatable run out) and TMR (track mis-registration).

A solution for the reduction of separation or lifting of the tracing from the suspension and/or off-track motion caused by windage was to implement additional welds to anchor the free span of the flexure between weld points at 43 and 44. However, additional welds are not without certain drawbacks. Additional welds inherently increase the stiffness of the suspension which can have a detrimental affect upon the suspension's ability to properly flex and function during hard disk drive operation.

Another solution was to re-route a tracing from that of FIG. 2 to that of FIG. 3. In FIG. 2 the tracing of the flexure 287 goes outside of the load beam just before the hinges 225. The tracing then is routed alongside the hinges and mount plate 223. The bending and twisting motion of the tracing along side the hinges under dynamic loading such as shock and windage can cause substantial off track motion of the slider in this design. In FIG. 3 the situation is improved by routing the tracing so that it goes through the center of the two hinges 325. In doing so, the off track motion of the slider can be reduced when the tracing is twisting and bending under dynamic loading such as shock and windage.

With reference to both FIGS. 8 and 9, there is, inherent to both tracings, a dynamic that can be described by mass and stiffness or rigidity.

FIG. 8 is an illustration of the stainless steel portion of a conventional single serpentine tracing, implementable upon a suspension susceptible to windage effects during operation of a hard disk drive. Serpentine tracing 87 includes an end 82 that is oriented toward a slider, e.g., slider 8 of FIG. 7, and an opposing end 83 that is to be oriented toward a tail of an actuator arm to which a suspension upon which tracing 87 is disposed. Serpentine tracing 87 further includes a turning portion that changes the direction of tracing 87 from a direction that is parallel to the midline of the suspension, upon which tracing 87 is mounted, so as to relocate tracing 87 such that tracing 87 parallels the midline of the suspension but is now located proximal to an outer edge of the suspension. Tracing 87 is shown to have a plurality of bridges 86.

However, a single serpentine tracing having a layer of stainless steel as shown is not without certain drawbacks. For example, the physical characteristics of tracing 87 are such that an outer portion 88 of the turning portion is less rigid than an inner portion 89 of the turning portion. By virtue of outer portion 88 being less rigid that inner portion 89, tracing 87 can have twisting motion as it bends under dynamic loadings as shown in FIG. 7.

FIG. 9 is an illustration of the stainless steel portion of a conventional dual-serpentine tracing, implementable upon a suspension susceptible to windage effects during operation of a hard disk drive. Dual-serpentine tracing 97 includes an end 92 that is oriented toward a slider, e.g., slider 8 of FIG. 7, and an opposing end 93 that is to be oriented toward a tail of an actuator arm to which a suspension upon which tracing 97 is disposed. Serpentine tracing 97 further includes a turning portion that changes the direction of tracing 97 from a direction that is parallel to the midline of the suspension, upon which tracing 97 is mounted, so as to relocate tracing 97 such that tracing 97 parallels the midline of the suspension but is now located proximal to an outer edge of the suspension. Tracing 97 is shown to have a plurality of bridges 96.

Similarly, a dual-serpentine tracing having a stainless steel portion as shown is not without similar drawbacks same as the single serpentine. The physical properties of conventional dual-serpentine tracing 97 are such that an outer dual-serpentine portion 98 of the turning portion is less rigid than an inner dual-serpentine portion 99 of the turning portion. By virtue of outer dual-serpentine portion 98 being less rigid than inner dual-serpentine portion 99, tracing 97 is susceptible to effects of windage same as the single serpentine design.

Therefore, a need exists for a tracing that includes the functionality of a serpentine design while increasing resistance against torsion, rotation and off-track motion caused by windage (air-flow) present during hard disk drive operation.

SUMMARY OF THE INVENTION

Embodiments of the present invention provide such a need. An apparatus and system for a flexure resistant to windage effects present during operation of a hard disk drive is described. In an embodiment, the apparatus consists of a flexure that is mounted to a load beam. The flexure includes an end portion proximal to a slider. The flexure further includes an opposite end proximal to a tail of an actuator arm. The flexure additionally includes a flexure direction re-router. The flexure direction re-router includes an inner radius and an outer radius. The outer radius has greater rigidity than the inner radius. The greater rigidity of the outer radius provides resistivity to windage effects.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

An apparatus and system to resist windage effects applicable to a tracing in a hard disk drive is described. In the following description, for purposes of explanation, numerous specific details are set forth in order to provide a thorough understanding of the present invention. It is noted that one skilled in the art will comprehend that the present invention may be practiced without these specific details. In other instances, well-known structures and devices are shown in block diagram form in order to avoid obscuring the present invention.

Some portions of the detailed descriptions, which follow, are presented in terms of procedures, steps, logic blocks, processing, and other symbolic representations of operations that can be performed in the operation of a hard disk drive. These descriptions and representations are the means used by those skilled in the data processing arts to most effectively convey the substance of their work to others skilled in the art. A procedure, executed step, logic block, process, etc., is here, and generally, conceived to be a self-consistent sequence of steps, instructions, or fabrications leading to a desired result. The steps are those requiring physical manipulations of physical entities and/or quantities. Usually, though not necessarily always, these entities take the form of structures, components, and/or circuits utilized in the operation of a hard disk drive.

It should be borne in mind, however, that all of these and similar terms are to be associated with the appropriate physical entities and are merely convenient labels applied to these entities. It is noted that throughout the present invention, discussions are presented that refer to actions and/or processes of a tracing in conjunction with a load beam of a suspension during hard disk drive operation or other such data storage enabling devices.

The present invention is discussed primarily in the context of a hard disk drive. Embodiments of the present invention can be readily implemented in conventionally sized hard disk drives, e.g., 3.5 inch, as well as diminutively sized hard disk drives, including those of low profile height. One such miniature hard disk drive (MHDD) is the Microdrive™. Embodiments of the present invention are well suited to be utilized in larger sized hard disk drives of low profile as well. Embodiments of the present invention can be used with alternative types of hard disk drives including, but which is not limited to, low profile hard drives (e.g., 1.8 inch form factor HDDs), embedded hard disk drives, and other data storage devices that have the capability to affect access upon a data storage device and from which data can be stored and/or otherwise manipulated.

Figure 1:
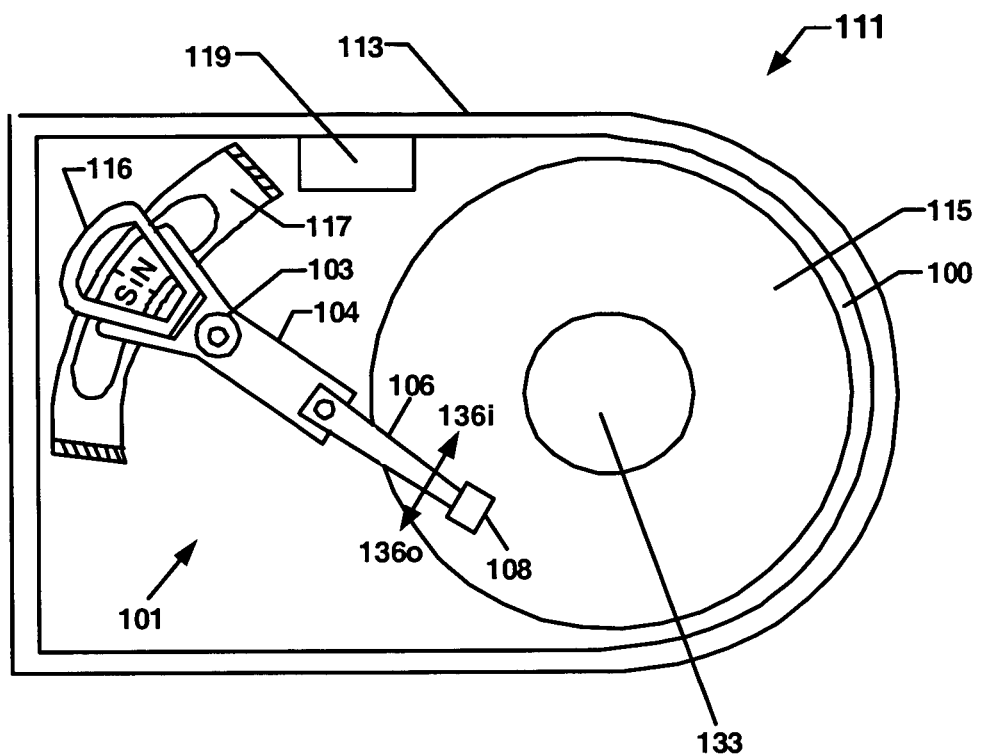
FIG. 1 is a block diagram of a hard disk drive including a spindle motor in an embodiment of the present invention.

FIG. 1 shows a schematic of a hard disk drive 111 in which an embodiment of the present invention can be implemented. Currently, low profile hard disk drives such as a 1.8-inch form factor and a Microdrive™ hard disk drive compatible with the Compact Flash Type II form factor have a height of 5.0 millimeters. In other instances, a Microdrive™ can have a form factor footprint smaller than that of the Compact Flash standard. It is particularly noted that embodiments of the present invention are well suited for implementation in most hard disk drives including, but which is not limited to, conventionally sized (e.g., 3.5 inch) hard disk drives, low profile hard disk drives, miniature hard disk drives, and micro drive hard disk drives.

Hard disk drive 111 includes an outer housing or base 113 containing one (shown) or more magnetic disks 115. A spindle motor assembly 100 having a central drive hub 133 rotates magnetic disks 115. Within spindle motor assembly 100 there is a bearing system containing a shaft and sleeve assembly. An actuator 101 includes a plurality of actuator arms 104 (one shown) in the form of a comb that is pivotally mounted above a pivot assembly 103. A controller 119 is also coupled to base 113 for selectively moving the actuator arm 104 relative to disk 115 and for regulating the rotating speed of disks 115.

In the embodiment shown in FIG. 1, actuator arm 104 has extending there from a cantilevered load beam or suspension 106, a magnetic read/write transducer or head 108 mounted on a slider secured to a flexure that is flexibly mounted to each suspension 106. Particularly, embodiments of the present invention provide a flexure that is resistant to windage effects during hard disk drive operation, e.g., flexure 487 of FIG. 4 and flexure 587 of FIG. 5, respectively. Read/write head 108 magnetically reads data from and magnetically writes data to disk 115. The head gimbal assembly is read/write head and slider 108 mounted on suspension 106. Suspension 106 has a spring like quality for biasing or urging the slider against the disk to enable the creation of air bearing film, or air bearing surface, between the slider and the disk surface. A voice coil 116 housed within a conventional voice coil motor magnet (VCM) assembly 117 (top pole not shown) having a magnet (not shown) is also mounted to actuator arm 104 opposite the head gimbal assembly. Movement of the actuator 101 by controller 119 moves the head gimbal assembly radially across tracks on the disks 115 (inwardly as indicated by arrow 136i and outwardly as indicated by arrow 136o) until heads 108 settle on the target tracks.

Figure 2:
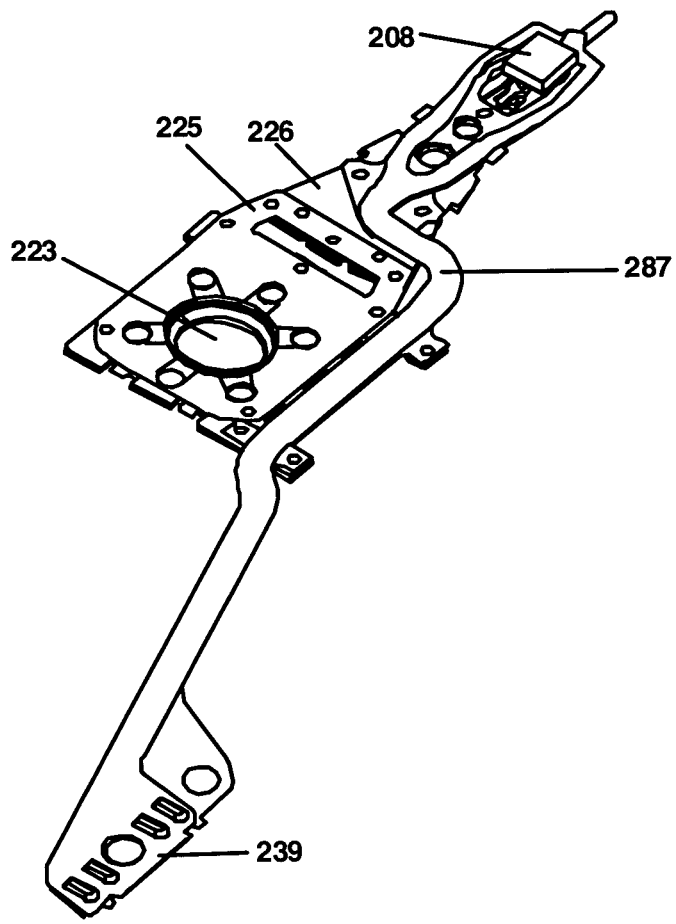
FIG. 2 is an illustrated bottom view of a four-piece suspension upon which embodiments of the present invention can be practiced.

FIG. 2 is a bottom view perspective illustration of a four-piece design type suspension 206, implementable as suspension 106 of FIG. 1, and upon which embodiments of the present invention can be implemented. Suspension 206 includes a transducer 208 oriented at one end and a tail 239 at the opposite end. Interposed between transducer 208 and tail 239 is tracing or flexure 287 into which embodiments of the present invention can be implemented. Tracing 287 provides electrical and communicative coupling between transducer 206 and tail 239. Transducer 206 is for reading from data and writing data to a hard disk 115. Four-piece suspension 206 further includes a mount plate 223, a hinge plate 225, and a load beam 226. In this illustration, it is noted that prior to reaching the hinge area, flexure 287 has it's routing altered such that flexure 287 is thereby located near or on an outer edge area of load beam 226. Embodiments of the present invention, e.g., flexure 487 and 587 of FIGS. 4 and 5, respectively, are configured for implementation within flexure 287 at approximately the location of the described tracing routing change.

Figure 3:
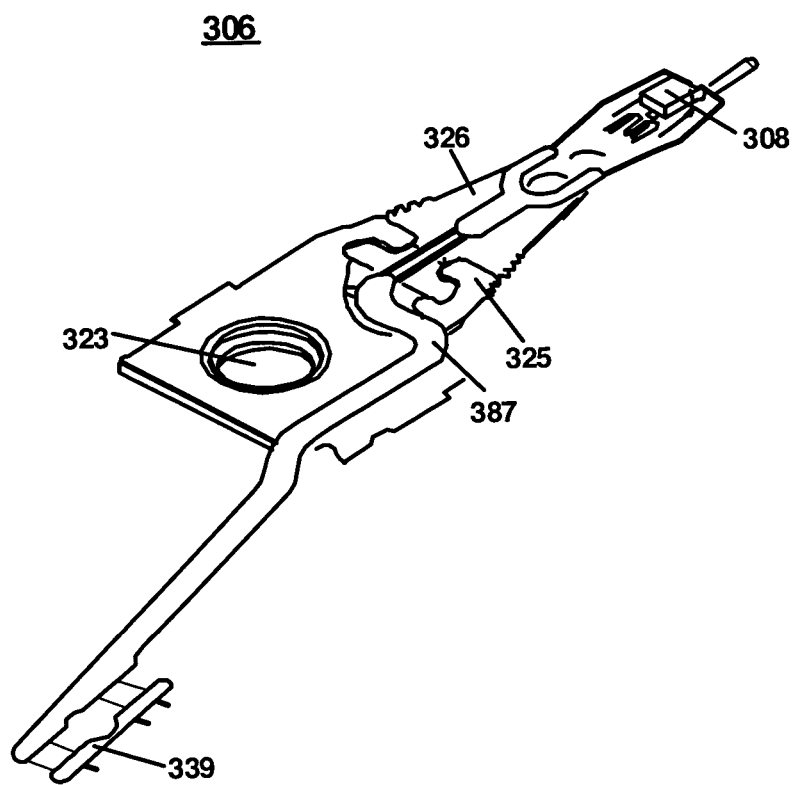
FIG. 3 is an illustrated bottom view of a suspension configured to have a tracing routed through the hinge portion and upon which embodiments of the present invention can be practiced.

FIG. 3 is a bottom view perspective illustration of an improved design suspension 306, implementable as suspension 106 of FIG. 1, and upon which embodiments of the present invention can be implemented. Similar to suspension 206, suspension 306 includes a transducer 308, a tail 339, and interposed therebetween is a flexure 387. Suspension 306 further includes a mount plate 323, a hinge plate 325, and a load beam 326. In comparison with suspension 206 of FIG. 2, suspension 306 differs slightly in design. In suspension 306, the hinge plate is designed such that flexure 387 can be routed through its center. Once past the hinge area, flexure 387 is then re-routed such that flexure 387 is thereby located near or on an outside edge of load beam 226. Embodiments of the present invention, e.g., flexure 487 and 587 of FIGS. 4 and 5, respectively, are configured for implementation within flexure 387 at approximately the location of the described tracing re-routing.

Figure 4:
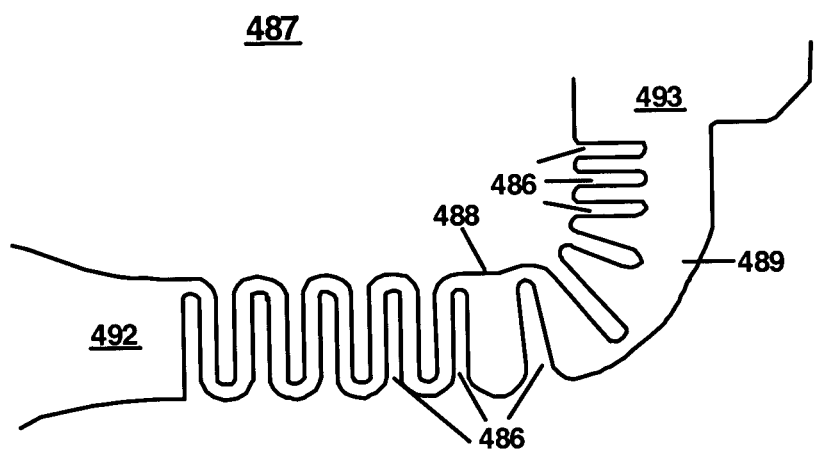
FIG. 4 is an illustration showing a flexure having a single serpentine design in an embodiment of the present invention.
Figure 5:
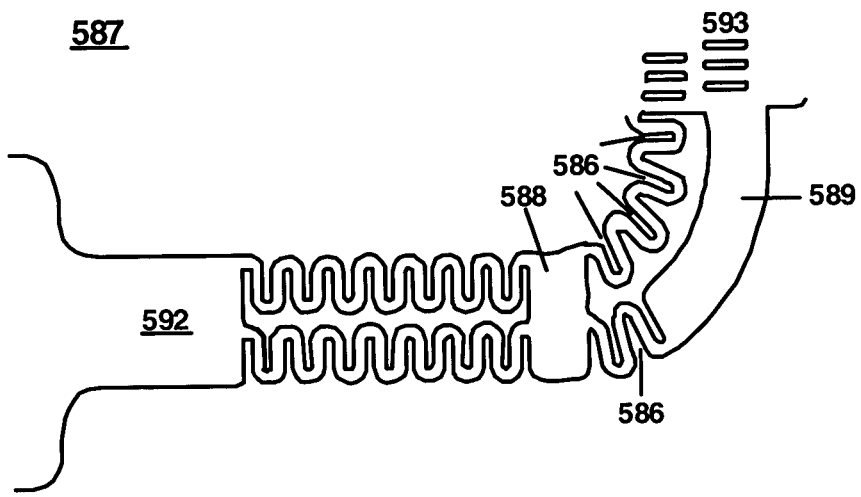
FIG. 5 is an illustration showing a flexure having a dual serpentine design in an alternative embodiment of the present invention.

With combinational reference to the flexures shown in FIGS. 4 and 5, e.g., flexure 487 and 587, respectively, those well skilled in art are cognizant of the numerous fabrication techniques that can be utilized to achieve the resulting flexures 487 and 587. Accordingly, any of the many well-known fabrication techniques, e.g., patterning, etching, and the like, or combinations thereof, can be utilized in the fabrication of flexures 487 and 587. It is further well known in the art that a flexure is comprised of layers, e.g., a bottom stainless steel layer, a second dielectric layer (e.g., polyimide), a conductive layer (e.g., copper) and a cover layer (e.g., a polyimide).

Figure 8:
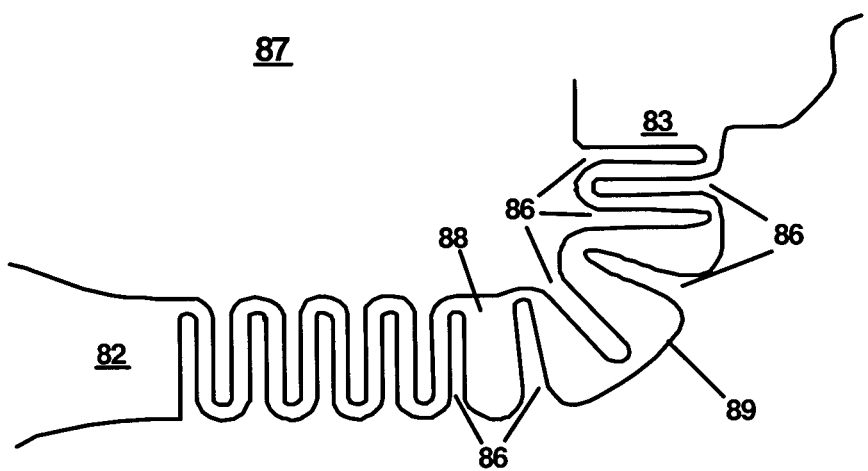
FIG. 8 is an illustration of a conventional single serpentine tracing that can be affected by windage during hard disk drive operation.

FIG. 4 is an illustration of a stainless steel layer or portion of a single serpentine design flexure 487 implementable within suspension 206 of FIG. 2 and suspension 306 of FIG. 3 and suspension 106 of FIG. 1 in an embodiment of the present invention. In the present embodiment, stainless steel is utilized as the supportive or stiffening layer within flexure 487. Alternatively, other materials having analogous physical characteristics can be used as the supportive layer. Flexure 487 includes a plurality of bridges 486. Flexure 487 is shown to have an end portion 492, configured for orientation toward a slider, e.g., slider 108, 208 or 308 of FIGS. 1, 2 or 3, respectively, and an opposite end portion 493 configured for orientation toward a tail, tail 239 and 339 of FIGS. 2 and 3, respectively. Flexure 487 further includes an inner radius 488 and an outer radius 489. In the present embodiment, outer radius 489 is designed to have greater rigidity than inner radius 488. When compared to tracing 87, flexure 487 has a reduced number bridges located on outer radius 489. By virtue of outer radius 489 having fewer bridges designed therein, outer radius 489 has greater rigidity that inner radius 488. This greater outside stiffness can then balance or minimize the twisting motion of the tracing as it bends under dynamic loadings. Advantageously, flexure 487 provides greater resistance to windage effects than a conventional serpentine flexure as seen in FIG. 8.

Figure 9:
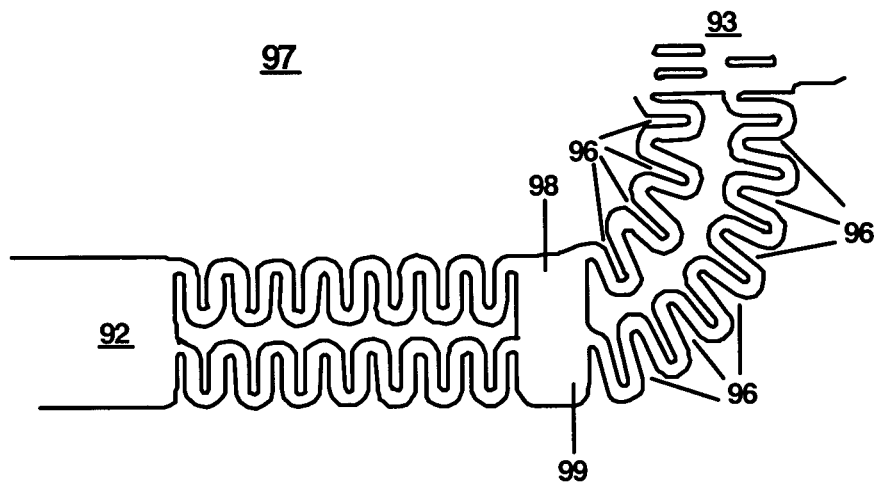
FIG. 9 is an illustration of a conventional dual-serpentine tracing that can be affected by windage during hard disk drive operation.

FIG. 5 is an illustration of a dual-serpentine design flexure 587 implementable within suspension 106, 206 and 306 of FIGS. 1, 2 and 3, respectively, in an embodiment of the present invention. In the present embodiment, stainless steel is utilized as the supportive or stiffening layer within flexure 587. Alternatively, other materials having analogous physical characteristics can be used as the supportive layer. Flexure 587 includes an inner serpentine portion 588 and an outer serpentine portion 589. Flexure 587 further includes a plurality of bridges 586, most of which are located within inner serpentine portion 588. Flexure 587 has an end 592 configured for orientation proximal to a slider, e.g., slider 108, 208 and 308 of FIGS. 1, 2 and 3 respectively. Flexure 587 has an opposing end 593 configured for orientation proximal to a tail of an actuator arm, e.g., tail 239 or FIG. 2 and tail 339 of FIG. 3. In the present embodiment and particularly when compared to conventionally designed dual-serpentine flexure 97 of FIG. 9, by virtue of the majority of bridges in flexure 587 being located on inner serpentine portion 588, flexure 587 has greater rigidity on outer serpentine portion 589, thus providing greater resistance to windage during hard disk drive operation in a similar manner as previously described with reference to FIG. 4.

Figure 6:
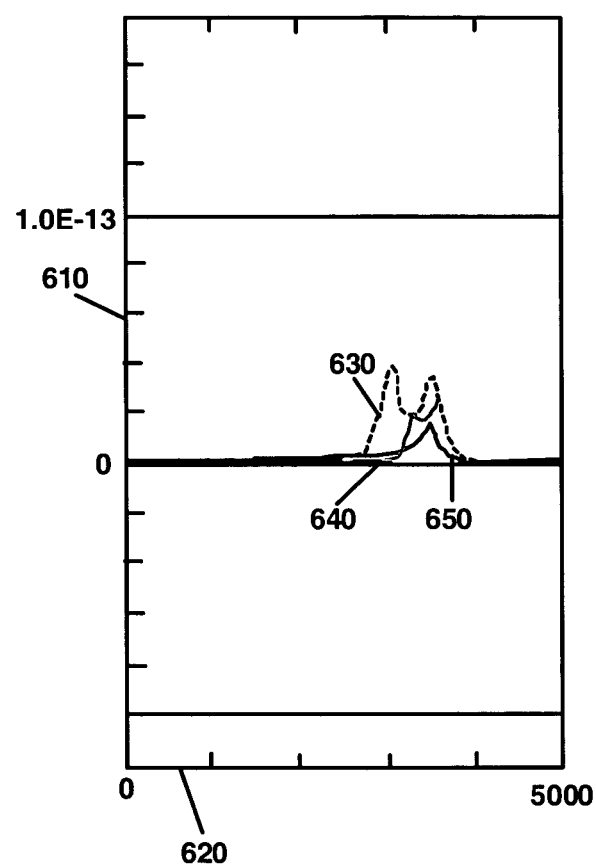
FIG. 6 is a graph illustrating a reduction in off-track slider motion in accordance with an embodiment of the present invention.
Figure 7:
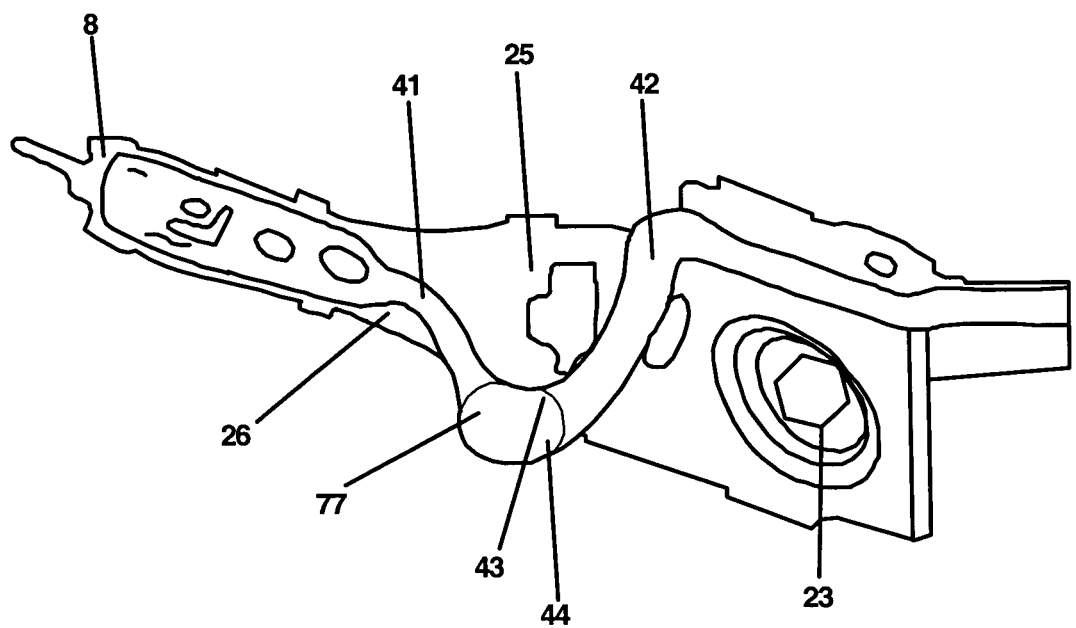
FIG. 7 is an illustration showing an effect of windage as realized by a conventional tracing.

FIG. 6 is a graph illustrating the relative reduction in off-track slider motion provided by and in accordance with embodiments of the present invention for a given mode shape under a given dynamic load. FIG. 6 includes a vertical line 610, representing slider displacement in millimeters and a horizontal line 620, representing frequency in which the displacement occurs. FIG. 6 shows dotted line 630 representing slider displacement and frequency observed in flexure 87 and/or 97 during operation of a hard disk drive in which either was implemented. Dotted line 630 shows an approximate displacement of less than 1 Pico meter. Grey line 640 shows a realized reduction in slider displacement for a single serpentine tracing in accordance with an embodiment of the present invention, e.g., flexure 487 in FIG. 4. Grey line 640 shows an approximate displacement that is substantially less than the displacement shown in dotted line 630. Further, solid line 650 shows an even greater reduction in slider displacement than that of dotted line 630. Solid line 650 shows a realized reduction in slider displacement for a dual-serpentine tracing in accordance with another embodiment of the present invention, e.g., flexure 587 in FIG. 5. It is noted that the frequency at which the displacement occurs is approximately 3500 Hertz.

Advantageously, embodiments of the present invention provide a flexure having less sensitivity to windage, e.g., air flow, present in a hard disk drive during operation, thus providing a reduction in slider displacement. By removing bridges from the outer radius of the turning portions of a single or dual serpentine flexure, the added material, commonly stainless steel, provides greater rigidity to the outer radius, thus providing greater resistance to the effects of windage.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A flexure for implementation on a suspension in a hard disk drive, said flexure resistant to windage effects present during operation of said hard disk drive, said flexure comprising:
    an end portion proximal to a slider;
    an opposite end portion proximal to a tail of an actuator arm having swaged therewith said suspension, said flexure interposed between said slider and said tail, said suspension including a mount plate, a load beam, and a hinge plate that is configured such that said flexure is routed through a center of said hinge plate;
    a flexure direction re-router having an inner radius and an outer radius, said outer radius having more material than said inner radius, wherein said outer radius comprises greater rigidity than said inner radius, said greater rigidity providing resistivity to said windage effects by doing one or more of balancing and minimizing a twisting motion of said flexure as it bends under dynamic loading, said flexure direction re-router comprising:
        a turning section directing said flexure from parallel to a center line of said suspension and centered upon said suspension to a direction perpendicular to said center line; and
        an additional turning section directing said flexure from said direction perpendicular to said center line to a direction parallel to said center line and located proximal to an outer edge portion of said suspension;
    wherein once said flexure is routed through said center of said hinge plate and is past a hinge area, said flexure is re-routed such that said flexure is thereby located at one of the following locations: near an outside edge of said load beam and on said outside edge of said load beam.

2. A hard disk drive configured for resistance against windage affecting the functionality of an actuator arm operable in said hard disk drive, said hard disk drive comprising:
    a flexure interposed between a slider on a suspension and a tail of said actuator arm within said hard disk drive, said actuator arm having said suspension swaged therewith, said suspension comprising a mount plate, a load beam, and a hinge plate, said hinge plate being configured such that said flexure is routed through a center of said hinge plate, said flexure having an end portion proximal to said slider and an opposite end portion proximal to said tail; and
    a flexure director for re-routing direction of said flexure, said flexure director having an inner radius and an outer radius, said outer radius having more material than said inner radius, said outer radius comprising greater rigidity than said inner radius, said greater rigidity providing resistivity to effects of said windage by doing one or more of balancing and minimizing a twisting motion of said flexure as it bends under dynamic loading, said flexure director comprising:
        a turning section directing said flexure from parallel to a center line of said suspension and centered upon said suspension to a direction perpendicular to said center line; and
        an additional turning section directing said flexure from said direction perpendicular to said center line to a direction parallel to said center line and located proximal to an outer edge portion of said suspension;
    wherein once said flexure is routed through said center of said hinge plate and is past a hinge area, said flexure is re-routed such that said flexure is thereby located at one of the following locations: near an outside edge of said load beam and on said outside edge of said load beam.

3. A system for resisting windage effects applicable to a suspension in a hard disk drive, said windage effects present during operation of said hard disk drive, said system comprising:
    means for communicatively coupling a slider to a tail of an actuator arm in said hard disk drive, said means for communicatively coupling having an end portion proximal to said slider and having an opposite end portion proximal to said tail, said slider mounted to said suspension, said suspension swaged to said actuator arm, said suspension comprising a mount plate, a load beam, and a hinge plate, said hinge plate being configured such that a flexure is routed through a center of said hinge plate;

means for redirecting said means for communicatively coupling, said means for redirecting having an outer radius with greater rigidity than an inner radius of said means for redirecting, said outer radius having more material than said inner radius, said greater rigidity providing resistivity to said windage effects by doing one or more of balancing and minimizing a twisting motion of said flexure as it bends under dynamic loading, said means for redirecting comprising:

a turning means, said turning means for re-routing said means for communicatively coupling from a direction parallel to a center line on said suspension to a direction perpendicular to said center line; and an additional turning means, said additional turning means for re-routing said means for communicatively coupling from said direction perpendicular to said center line to a direction parallel to said center line and locating said means for communicative coupling proximal to an outer edge of said suspension;

wherein once said flexure is routed through said center of said hinge plate and is past a hinge area, said flexure is re-routed such that said flexure is thereby located at one of the following locations: near an outside edge of said load beam and on said outside edge of said load beam.

\* \* \* \* \*